US011465121B1

(12) United States Patent
Navin et al.

(10) Patent No.: US 11,465,121 B1
(45) Date of Patent: Oct. 11, 2022

(54) PROTECTIVE TECHNOLOGY WITH REACTIVE SOLID SORBENT FOR OXIDATIVE DECONTAMINATION OF TOXIC MATERIALS

(71) Applicant: U.S. Army Edgewood Chemical Biological Center, APG, MD (US)

(72) Inventors: Jason K. Navin, Aberdeen, MD (US); Christopher J Karwacki, Churchville, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 328 days.

(21) Appl. No.: 16/215,931

(22) Filed: Dec. 11, 2018

Related U.S. Application Data

(60) Provisional application No. 62/597,609, filed on Dec. 12, 2017.

(51) Int. Cl.
| | |
|---|---|
| *B01J 20/10* | (2006.01) |
| *B01J 20/28* | (2006.01) |
| *B01J 20/30* | (2006.01) |
| *A62D 3/30* | (2007.01) |
| *A62D 101/04* | (2007.01) |
| *A62D 101/02* | (2007.01) |
| *D06M 11/45* | (2006.01) |
| *D06M 11/46* | (2006.01) |
| *D06M 11/79* | (2006.01) |

(52) U.S. Cl.
CPC .............. *B01J 20/103* (2013.01); *A62D 3/30* (2013.01); *B01J 20/28007* (2013.01); *B01J 20/28016* (2013.01); *B01J 20/28061* (2013.01); *B01J 20/3028* (2013.01); *B01J 20/3042* (2013.01); *A62D 2101/02* (2013.01); *A62D 2101/04* (2013.01); *B01J 2220/42* (2013.01); *D06M 11/45* (2013.01); *D06M 11/46* (2013.01); *D06M 11/79* (2013.01)

(58) Field of Classification Search
CPC ................ B01J 20/103; B01J 20/28007; B01J 20/28016; B01J 20/28061; B01J 20/3028; B01J 20/3042; A62D 3/30
See application file for complete search history.

(56) References Cited

U.S. PATENT DOCUMENTS

| | | | | |
|---|---|---|---|---|
| 1,958,204 A | * | 5/1934 | Reichert ............... | C01B 15/037 423/273 |
| 7,276,468 B1 | * | 10/2007 | Tucker .................. | A61K 31/14 252/186.38 |

(Continued)

FOREIGN PATENT DOCUMENTS

KR 1699631 B1 * 1/2017

*Primary Examiner* — Colin W. Slifka
*Assistant Examiner* — Michael Forrest
(74) *Attorney, Agent, or Firm* — Ulysses John Biffoni (57) ABSTRACT

A solid particulate reactive sorbent for decontaminating toxic chemical and biological agents and its method of making. The reactive sorbent comprising a plurality of aggregates formed from linked hydrophilic nanoparticles and individual nanoparticles that bind at least one detoxifier, such that the sorbent absorbs the agents, allowing the detoxifier to oxidize and decontaminate the agents for removal. More preferably, the hydrophilic nanoparticles comprise fumed silica and the detoxifier comprises hydrogen peroxide.

14 Claims, 6 Drawing Sheets

(56) References Cited

U.S. PATENT DOCUMENTS

| | | | |
|---|---|---|---|
| 2005/0207955 A1* | 9/2005 | Wang | B01J 20/14 |
| | | | 423/210 |
| 2009/0191137 A1* | 7/2009 | Vempati | A61Q 11/00 |
| | | | 424/49 |
| 2013/0183495 A1* | 7/2013 | Rock | D06M 16/00 |
| | | | 427/256 |
| 2015/0140047 A1* | 5/2015 | Greenwald | D06M 10/08 |
| | | | 424/618 |

* cited by examiner

U.S. Pat. No. 11,465,121 B1

PROTECTIVE TECHNOLOGY WITH REACTIVE SOLID SORBENT FOR OXIDATIVE DECONTAMINATION OF TOXIC MATERIALS

PRIORITY CLAIM

This patent application claims the benefit of priority of U.S. Provisional Patent Application Ser. No. 62/597,609, filed on Dec. 12, 2017.

FIELD OF THE INVENTION

This invention relates to a solid particulate sorbent material containing reactive components to decontaminate and oxidize chemical warfare agents, organic compounds, and biological contaminants.

BACKGROUND OF THE INVENTION

Current protective technologies, including filtration, decontamination, and personal protective equipment ("PPE"), are designed to remove toxic chemicals and biological hazards through either physisorption of these chemical and biological contaminants onto high surface area materials present in sorbent media, or by providing a non-breathable barrier. However, these adsorbed contaminants are merely trapped in their unreacted or active state so that harmful chemicals will desorb over time and biological hazards will persist. Although there are some filter and absorptive media that are reactive toward harmful chemicals and biological hazards, these materials can only decontaminate a small subset of toxic chemicals and are ineffective against biological agents. Although there is much focus on chemical warfare agents ("CWAs"), such as mustard gas or sarin, and biological warfare agents ("BWAs"), such as Ebola or Anthrax, there is a multitude of chemicals and biologicals that are also toxic and hazardous. Certain toxic industrial chemicals like chlorine, potent pharmaceuticals such as the synthetic opioid fentanyl, and a myriad of pathogens are also major threats to our civilian population, military, and first responders. Therefore, it is paramount to develop and implement protective technologies that can mitigate or eliminate these threats.

In recent years one of the main focuses of protective technologies, has been the reaction of toxic chemicals to more stable, less hazardous derivatives via oxidation. Oxidation of chemical and biological threats eliminates the issue of chemical desorption, as the products of reaction are significantly more innocuous, and biological threats are deactivated. Examples of chemical oxidation include the oxidation of the vesicant mustard gas (HD) to the corresponding sulfoxide (HDO) which is a non-vesicant and the perhydrolysis of nerve agents such as VX and GD to their non-toxic phosphonic acid forms. Examples of biological oxidation include the deactivation of *Escherichia coli* and *Staphylococcus aureus* by hydrogen peroxide mist. Peroxide-based compounds can effectively oxidize chemical and biological agents making them less hazardous or deactivated. Mildly-basic peroxide is also known to be effective at neutralizing VX and GD to their non-toxic phosphonic acids through perhydrolysis. Peroxide-based materials are preferred for oxidative decontamination because they are relatively non-toxic and stable, as compared to traditional, hypochlorite-based reagents which are corrosive, toxic, and generate hazardous products.

While it is desirable to decontaminate chemical warfare agents by oxidation in a peroxide system, presently known systems require activators that either add production cost and degrade the oxidants over time or are present in a gel or liquid form that is not conducive to absorbing target compounds that may be present in non-viscous, liquid or vaporous forms. Ideally then, a material is required that can not only absorb target compounds but also stabilize an oxidant to decontaminate biological and chemical agents.

Furthermore, although it is possible to generate a material capable of oxidation in the form of solid or powder, peroxides generally decompose in the presence of metals, whether the metal is in metallic or ionic form. This limitation reduces the total amount of solid materials that can stabilize hydrogen peroxide, organic peroxides, or peroxyl groups. Silicon dioxide however, is a nonmetal and so, should not catalyze the decomposition of hydrogen peroxide. Additionally, silicon dioxide has a high surface area and great affinity for absorbing material, such that silicon dioxide acts as a dry, flowable solid decontamination agent for absorbing spills and can be incorporated into filtration systems and devices. Silicon dioxide can also be embedded into or onto fibers, or sandwiched between layers of materials.

There have been numerous attempts for producing a detoxifying composition containing peroxide: U.S. Pat. No. 7,030,071 to Hoffman, et al. teaches a formation of solid-water detoxifying reagents for chemical and biological agents. Solutions of detoxifying reagent for chemical and biological agents are coated using small quantities of hydrophobic nanoparticles is a ratio of 95:5 by vigorous agitation or by aerosolization of the solution in the presence of the hydrophobic nanoparticles to form a solid powder. The solid-water (coated) detoxifying solutions can be blown into contaminated ventilation ducting or other difficult to reach sites for detoxification of pools of chemical or biological agent. Once the agent has been detoxified, it can be removed by flushing the area with air or other techniques. The detoxifying solution is weakly encapsulated by the nanoparticles, such that the porous coating breaks down and the detoxifying reagent is delivered directly to the chemical or biological agent for maximum concentration at the point of need. In Hoffman's composition the nanoparticles act as a barrier or coating and performs no sorbency whatsoever.

U.S. Pat. No. 6,455,751 to Hoffman, et al. teaches a gel composition containing oxidizing agents and thickening or gelling agents is used to detoxify chemical and biological agents by application directly to a contaminated area. The gelling agent is a colloidal material, such as silica, alumina, or alumino-silicate clays, which forms a viscous gel that does not flow when applied to tilted or contoured surfaces. Aqueous or organic solutions of oxidizing agents can be readily gelled with less than about 30% colloidal material. Hoffman's gel is not applicable for fibrous material, filtration units or devices that require quick disposal with minimum or no tool requirement.

U.S. Pat. No. 6,723,891 to Wagner, et al. teaches a decontamination system that utilizes a peroxide/molybdate reactive system suspended in a water-in-oil microemulsion. The molybdate component of the system is a peroxide activator by either generating singlet oxygen ($^1O_2$) which then diffuses out of the microemulsion and reacts with species that are present in the bulk organic solvent, or by generating a peroxomolybdate species. Being mildly basic, the molybdate activator allows for the perhydrolysis of both nerve agents VX and GD. The system functions in a variety of microemulsions, exhibiting high stability as well as the ability to remain liquid at low temperatures. Wagner's composition is in the form of emulsion and is not applicable for devices that can only incorporate solid sorbent.

U.S. Pat. No. 6,569,353 to Giletto, et al. teaches a two-component gel that is used to decontaminate toxic agents, wherein the components are combined before use, comprised of a first component containing sorbent containing $HSO_5^-$ ions, an oxidant, solvent, and sorbent and a second component containing an oxidant activator, solvent, and sorbent. The oxidant can be selected from perborates, persulfates, organic peroxides, alkali metal peroxides, alkali metal superoxides, and alkaline earth metal peroxides, preferably hydrogen peroxide. The sorbent material may be selected from silicon dioxide, silica gel, silicon oxyhydroxides, aluminum oxide, alumina gel, aluminum oxyhydroxides, aluminates, other metal oxides, other metal oxyhydroxides, clay minerals and mixtures thereof, preferably, fumed silica. Giletto's formulation contains numerous active ingredients, that would have increased the cost of the decontamination process. Furthermore, Giletto's gel, like Hoffman's gel, is not applicable to fabric, fibers, or filtration units.

Therefore, there remains a need for a versatile and economic decontamination composition to be incorporated into the various devices, or to be applied onto surfaces to both absorb and detoxify the toxic chemicals and hazardous biological agents present in either solid, liquid, aerosolized, or vaporous forms.

SUMMARY OF THE INVENTION

The invention is directed towards a free-flowing solid particulate reactive sorbent generally in the form of a dry powder, its use, and method of making, for decontaminating toxic chemical and biological agents, comprising a plurality of aggregates of hydrophilic nanoparticles that bind at least one detoxifying agent, wherein the reactive sorbent has a 5:1 to 1:1 ratio of the hydrophilic nanoparticles to the detoxifying agent. The reactive sorbent is essentially in the form of a dry powder.

BRIEF DESCRIPTION OF THE DRAWING

The accompanying drawings, which are incorporated into and form part of this disclosure, illustrate embodiments of the invention and together with the description, explain the principles of the invention.

DETAILED DESCRIPTION OF THE EMBODIMENTS OF THE INVENTION

The present invention is directed toward a free-flowing solid particulate reactive sorbent generally in the form of a dry powder for detoxifying chemical and biological agents. The reactive sorbent is comprised of a sorbent material made from a plurality of aggregates of linked and individual hydrophilic nanoparticles that are doped with, or bound to a mixture of at least one detoxifier and stabilizer, such that the mass ratio of the hydrophilic nanoparticles to the detoxifying agent is about 5:1 to 1:1, preferably 3:1 to 1.5:1, wherein upon contact with the toxic chemical and/or biological agents, the sorbent absorbs and/or binds these toxic agents and allows the detoxifier to decontaminate the chemical or biological agents through either oxidation or adsorption, and thereafter binds the agents and/or decontaminants for removal.

The invention is further directed toward a method of making the reactive sorbent, having incremental steps of mixing the detoxifying agents and sorbent material until the powder and flow morphology has been achieved, and thereafter dehydrate the reactive sorbent ready for use.

Sorbent

Useful sorbent materials for the present invention are inert or non-reactive with the oxidizing agents, and are selected from the group consisting of silicon oxyhydroxides, aluminum oxide, alumina, aluminum oxyhydroxides, aluminates, fumed silica, clay minerals and mixtures thereof. Preferably, the sorbent material is fumed silicon dioxide ($SiO_2$). Fumed silica is a low-cost bulk industrial thickening agent and has an extremely small particle size (0.007 to 0.014 μm), a large surface area (about 200-400 $m^2/g$), high purity (99.8%), and a low bulk density (30-40 $kg/m^3$). Fumed silica performs a multitude of functions: substrate, sorbent, and a reinforcement in the present detoxifying reactive sorbent. As a substrate and sorbent, fumed silica can bind both detoxifying agents as well as hazardous targets and products, and on the macro scale, can absorb liquid and some gases. Reinforcement increases the strength or viscosity of the sorbent for decontaminating agents, allowing them to be used in a wider number of applications, such as on ceilings, walls, and filtration units.

Fumed silica is known to thicken and suspend solids. However, for the present inventive reactive sorbent, the fumed silica is retained as solid particulates having detoxifiers contained within, to absorb toxic chemical and hazardous biological agents in either solid, liquid, aerosolized, or gaseous states, and yet allows detoxifiers to react with the chemical and biological agents. Sorption of the contaminants into the sorbent is highly effective because of the large surface area of fumed silica and its relatively large volume available for binding.

The sorbent of the present invention comprises a plurality of aggregates of individual particles, chains of individual particles, and linked particles of hydrophilic fumed silica that are either spherical, ellipsoidal, geometric, or irregularly shaped. Preferably, the sorbent is a plurality of aggregates of linked hydrophilic fumed silica spheres which are 30 to 70% fused into short chains and 0.05 to 0.4 microns long. The spheres are relatively uniform in size, and the chain lengths range from 5 to 50 units in length. The smaller the particles, the larger the estimate surface area. Useful silica for the present invention has a particle size of between 0.005 μm to 0.020 μm, preferably 0.007 μm to 0.014 μm. The surface area of the silica is between 100 to 700 $m^2/g$, preferably 200 to 400 $m^2/g$. The useful silica has a density of 1.5 to 5 $lb/ft^3$, preferably 2 to 4.5 $lb/ft^3$. Without wishing to be bound by theory, hydroxyl groups bonded to silicon atoms are present as the terminating groups on the silicon dioxide surface making the surface hydrophilic and capable of hydrogen bonding with suitable molecules. Additionally, van der Waals forces are capable of binding both hydrophobic and hydrophilic molecules as well. There are estimated to be 3.5 to 4.5 hydroxyl groups per $nm^2$ of silica surface, compared to a theoretical maximum of 7.85. The structure of fumed silica is amorphous and can be either porous, non-porous, or some mixture of morphology. In addition to silicon dioxide, aluminum oxide or titanium oxide may also be used.

It must be noted that hydrophilic fumed silica, unsaturated with water, is preferred for the present invention, such that the sorbent remains a free-flowing solid particulate generally in the form of a dry powder ready to absorb either solid, liquid, aerosolized, or gaseous forms of chemical and biological agents. A gel-form of the silica is not desired as it is not applicable for filtration unit fibers, various devices or equipment that do not accommodate gel, or sorbents. A useful amount of fumed silica would be in the amount of 25 to 80 wt. %, preferably 35 to 70 wt. %, of the particulate reactive sorbent.

Detoxifiers

The detoxifier is selected from the group consisting of perborates, persulfates, organic peroxides, inorganic peroxides, alkali metal oxides, alkali metal peroxides and mixtures thereof. Preferably, the detoxifier is hydrogen peroxide. The peroxide detoxifier may be stabilized by a stabilizer selected from the group consisting of lithium (I), sodium(I), potassium (I), magnesium (II), calcium (II), strontium (II), barium (II), manganese (II), manganese (IV), tin (II), tin (IV), or any of the aforementioned metals in a partially oxidized state as cations; and any oxide, hydroxide, chloride, sulfide, sulfite, fluoride, nitride, nitrate, oxynitride, oxyfluoride, stannate, phosphate, organic ligands, acetate, citrate, malonate, and phytate as anions. Preferably the stabilizer is potassium stannate and/or potassium phosphate. Useful amount of detoxifier is about 3 to 40 wt. %, preferably 10 to 25 wt. % of the reactive sorbent. Useful amount of stabilizer is about 0.01 ppm to 20 ppm, preferably 0.1 ppm to 10 ppm of the reactive sorbent.

Reactive Sorbent

Figure 1:
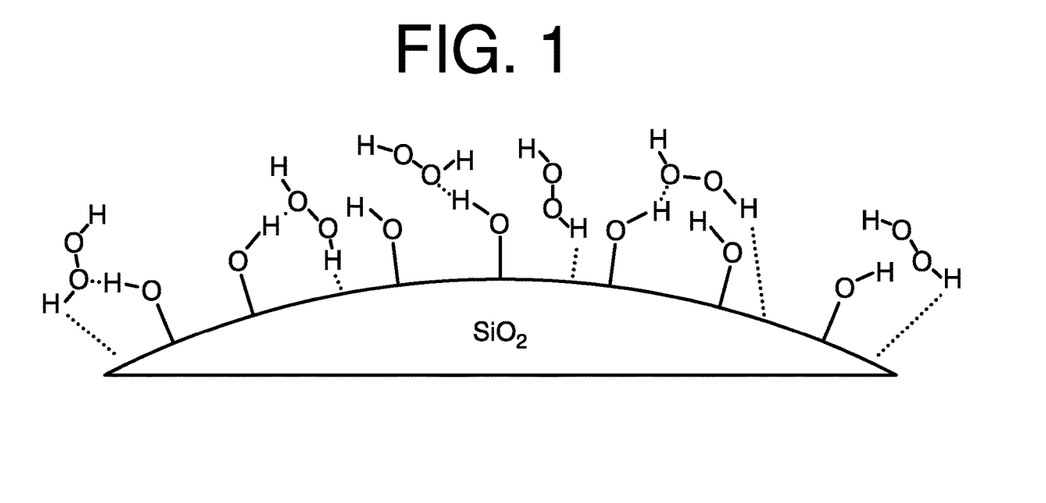
FIG. 1 depicts interactions between silicon dioxide and hydrogen peroxide molecules.
Figure 2:
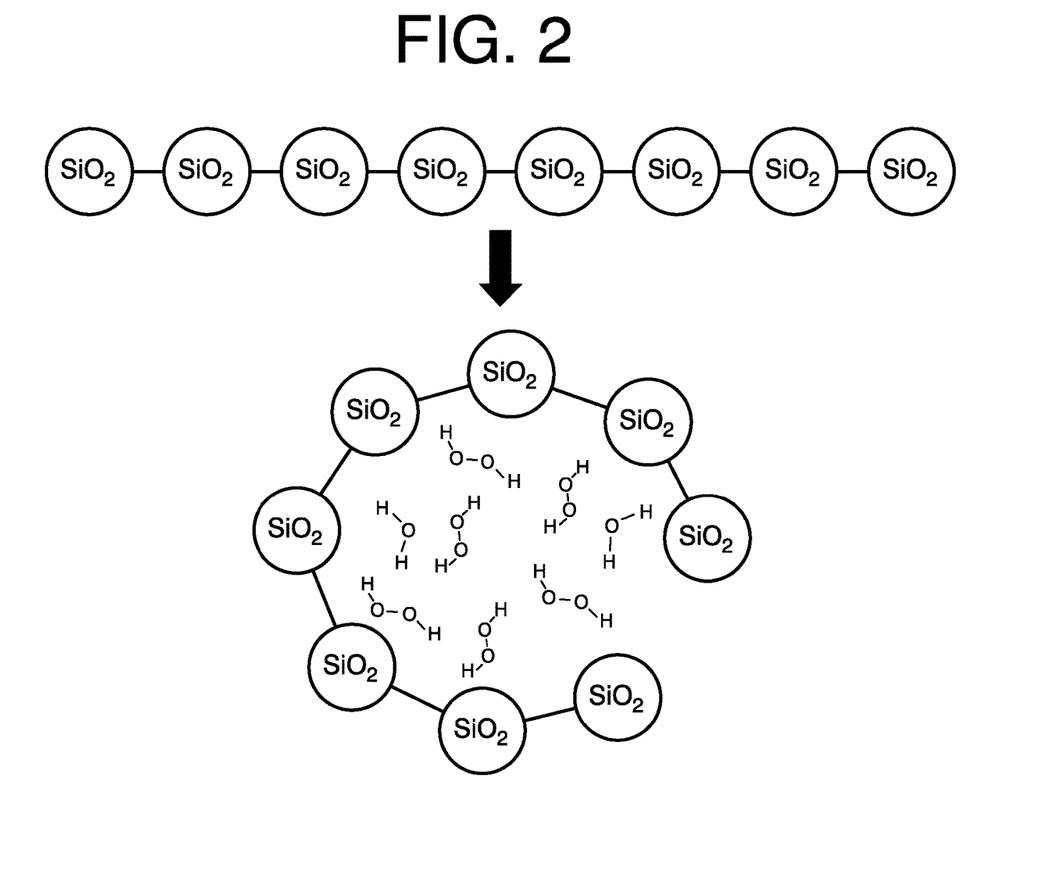
FIG. 2 depicts an enclosed configuration of hydrogen peroxide with linked silicon dioxide nanoparticles.
Figure 3:
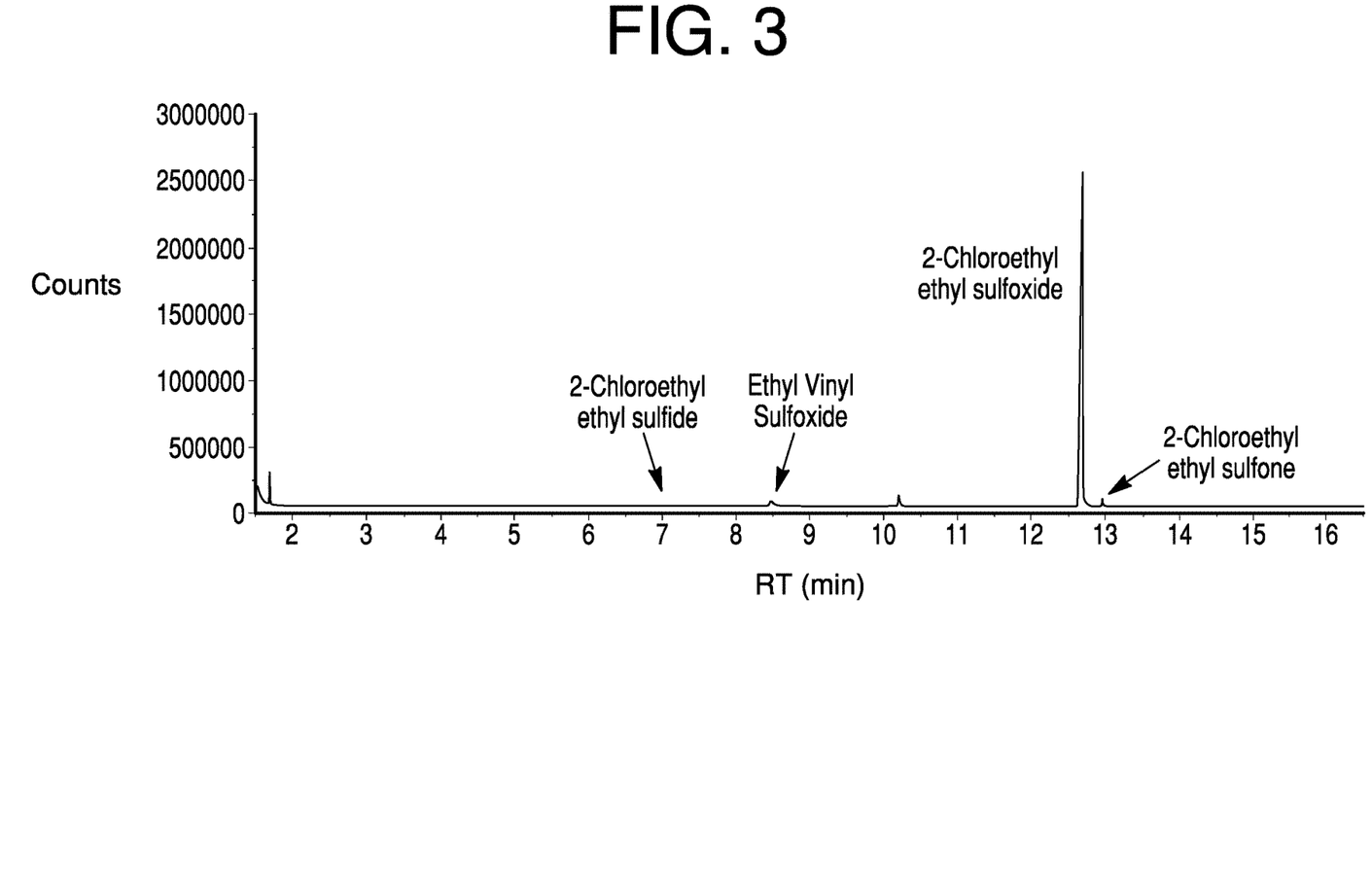
FIG. 3 depicts a GC-MS chromatogram showing the products of reaction of 2-chloroethyl ethyl sulfide, a simulant of mustard gas, with the reactive sorbent.
Figure 4:
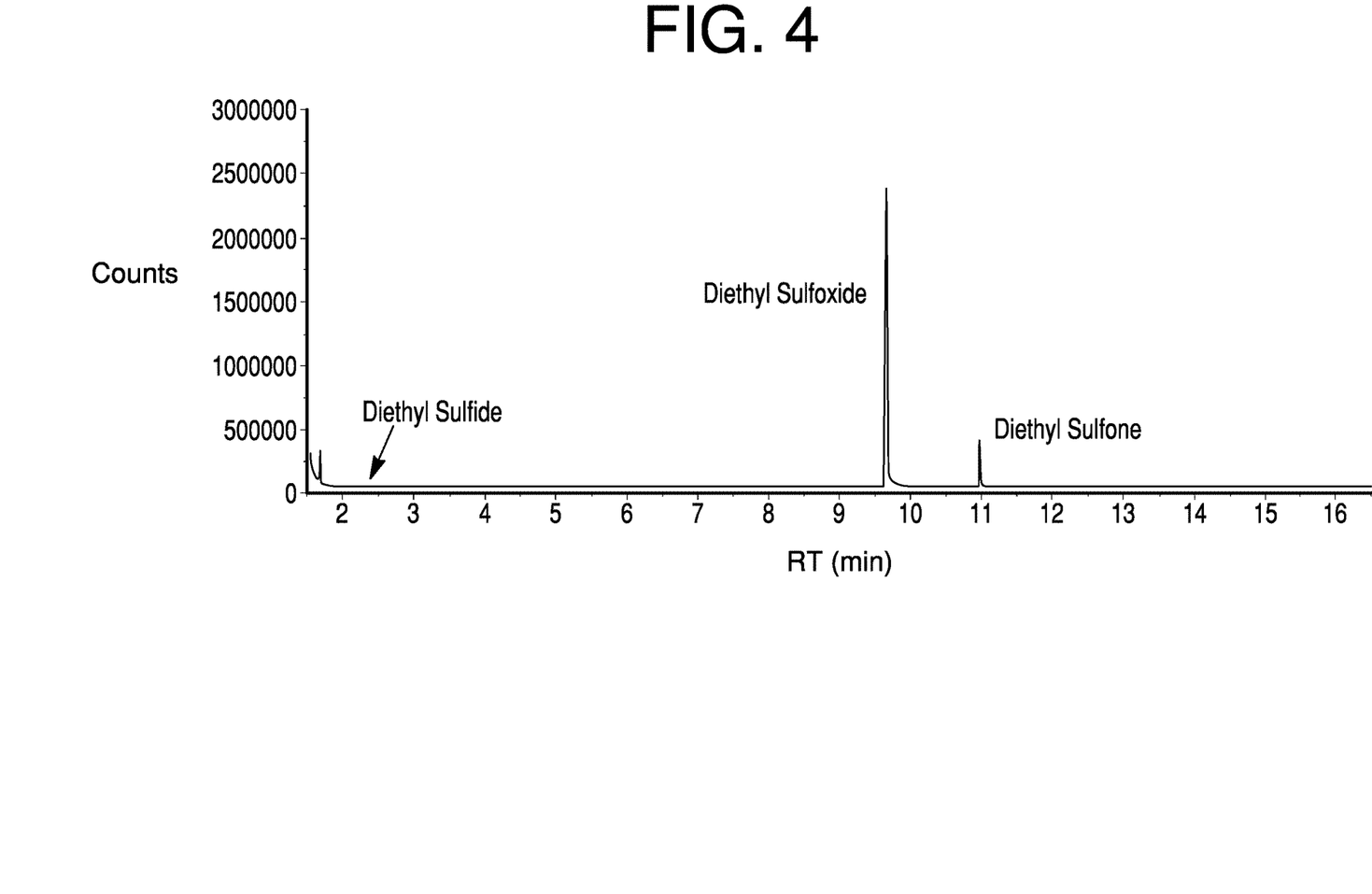
FIG. 4 depicts a GC-MS chromatogram showing the products of reaction of diethyl sulfide, a simulant of mustard gas, with the reactive sorbent.
Figure 5:
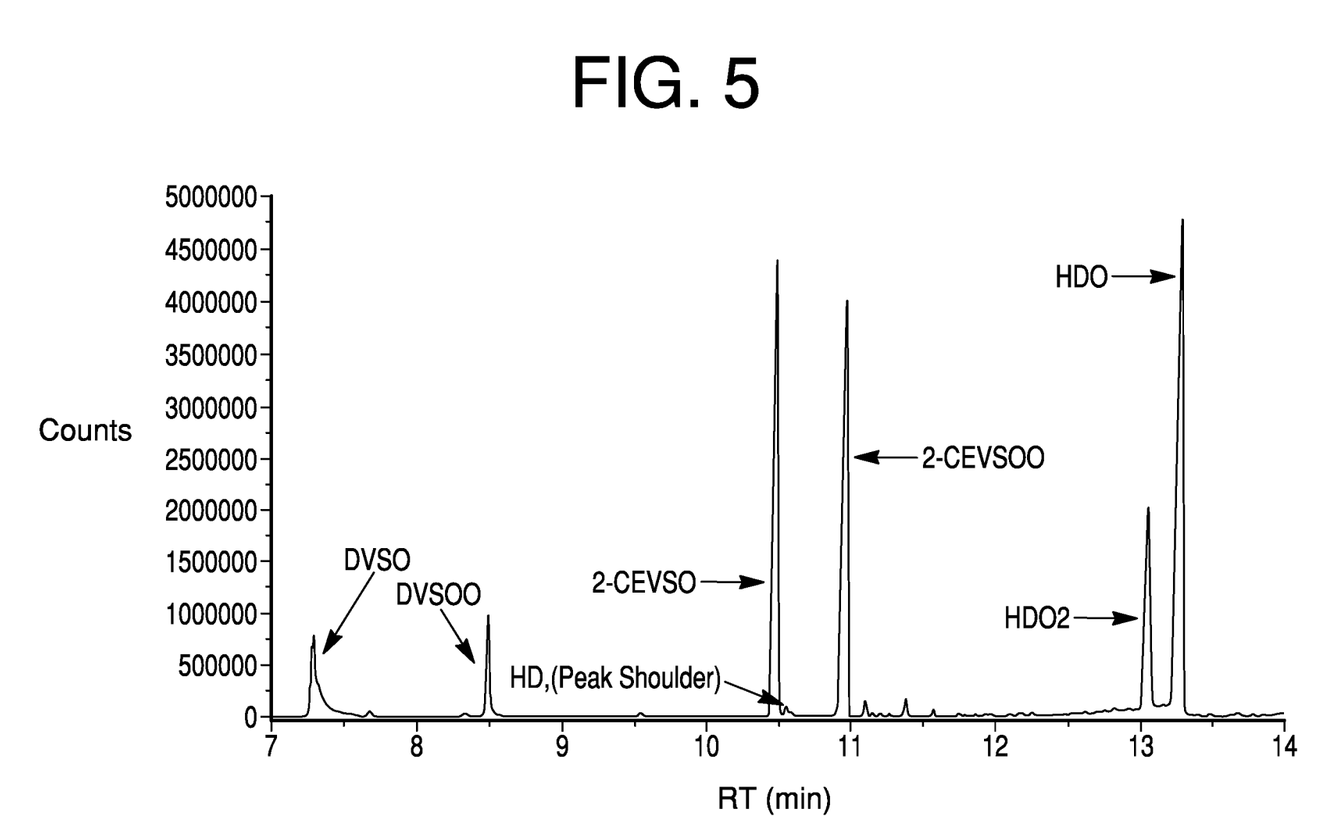
FIG. 5 depicts a GC-MS chromatogram showing the products of reaction of Mustard Gas (HD) with the reactive sorbent.
Figure 6:
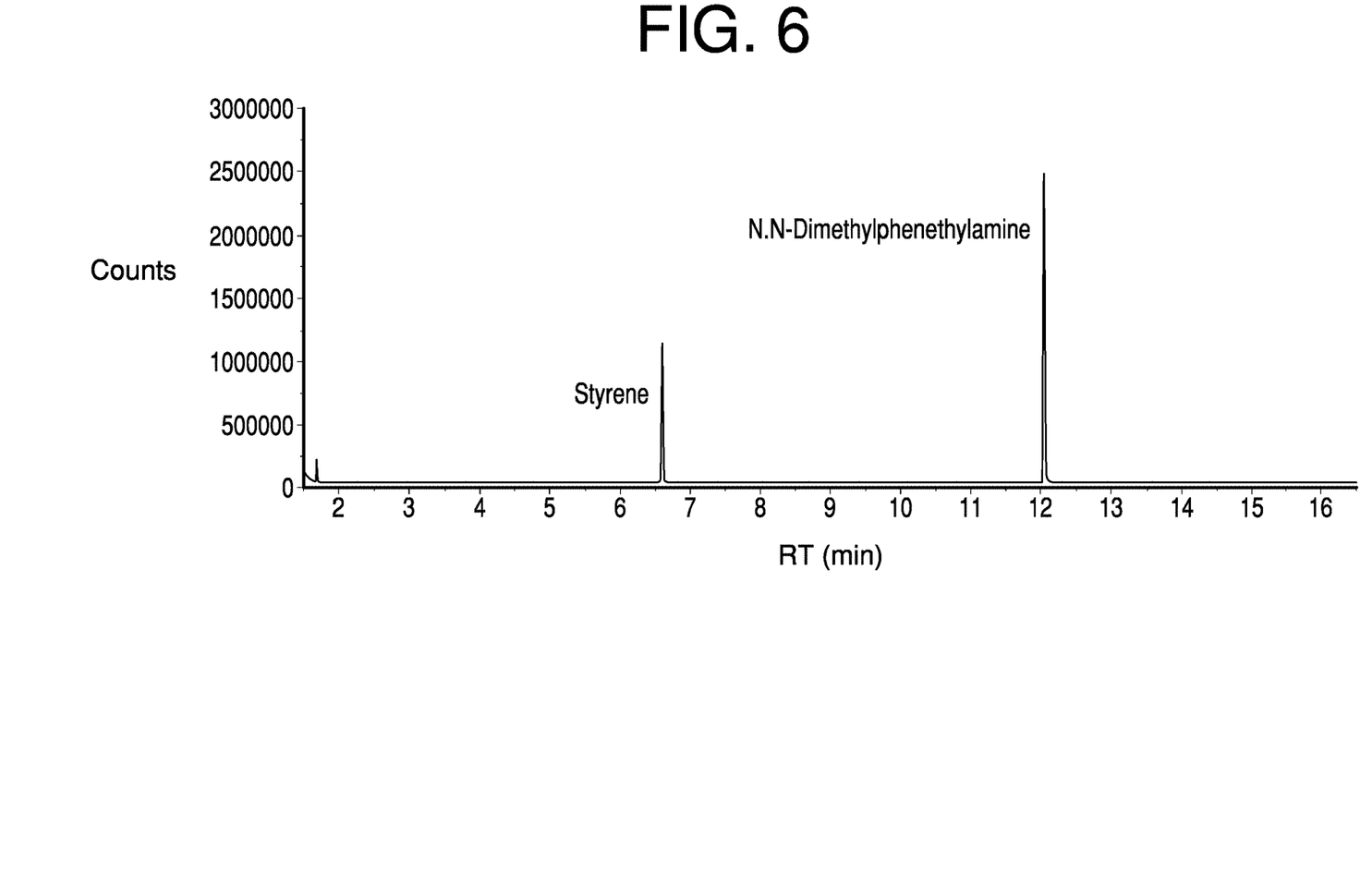
FIG. 6 depicts a GC-MS chromatogram showing the products of reaction of N,N-dimethylphenethylamine, a simulant of fentanyl, with the reactive sorbent.
Figure 7:
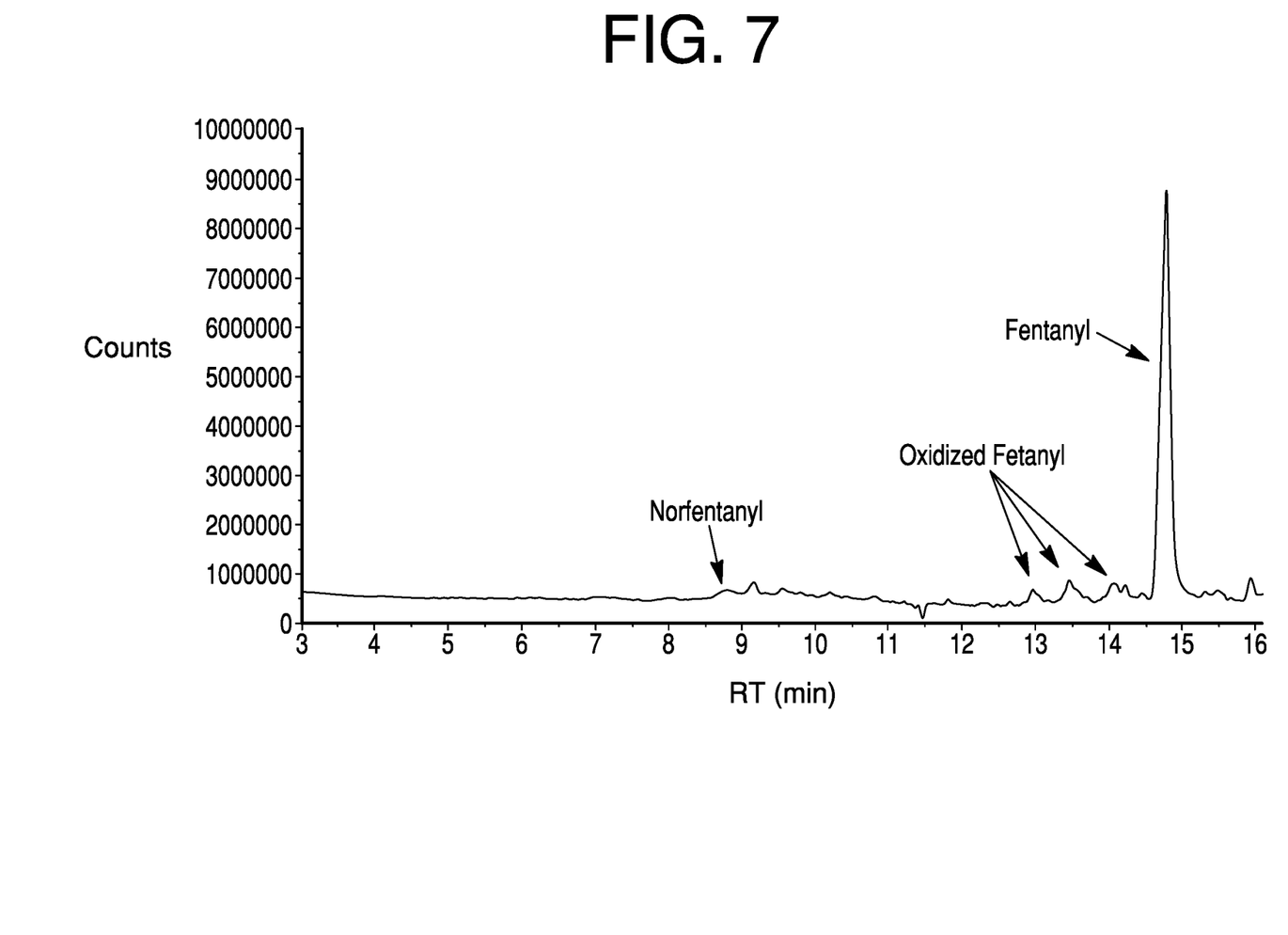
FIG. 7 depicts a LC-MS chromatogram showing the products of reaction of fentanyl-citrate on the reactive sorbent.

The reactive sorbent is comprised of nanoparticles of fumed silicon dioxide and hydrogen peroxide with potassium stannate and phosphate added as stabilizers. Without wishing to be bound by theory, the hydrogen peroxide binds to the surface of the silicon dioxide particles by means of the hydroxyl groups present on the silicon dioxide surface as shown in FIG. 1. Additionally, the chain-like structure of the silicon dioxide nanoparticles can trap larger amounts of hydrogen peroxide between the linked spheres of the silicon dioxide as shown in FIG. 2. For decontamination, the hydrogen peroxide that is bound to the silicon dioxide surfaces and, that which is present within the chains, reacts with an organic chemical or a pathogen that interacts with the surfaces of the silicon dioxide particles. The reactive sorbent has less than 45.0 wt. %, is preferably less than 20 wt. % of water. The present reactive sorbent does not require additional activators, or metal catalyst to start or control the temperature of the oxidation between the detoxifiers and the chemical or biological agents.

The present invention absorbs CWAs, BWAs, toxic chemicals, pharmaceuticals, or hazardous biologicals and thereby produces chemical degradation of the chemicals to eliminate them and leave less toxic or non-toxic byproducts, or to deactivate the biologicals. Besides military applications, the present invention also lends itself to degradation of non-warfare related, yet still harmful, chemical and biological contaminants. Additionally, the composition causes little or no damage to the surfaces onto which it is applied, making the reactive sorbent suitable for use on walls, carpets, filtration units, machinery, natural or synthetic fibers, fabric, combat gears, and other surfaces that are susceptible to corrosion or etching. The formulation is easily applied by spraying or pouring, is highly absorptive and effective at removing and decontaminating the agents from the surfaces. This invention can also be used as filtration media with various forms of filter or serve as an activated layer or component of protective technologies to include, but not limited to filters, filtration media, clothing, and fibers.

Biological agents that can be targeted using the present invention include any type of microorganisms, such as bacteria, fungi, yeasts, viruses, microsporidians (spores), protozoa, and phages. Notable bacterial agents include, but are not limited to: *Bacillus, Bartonella, Bordetella, Borrelia, Brucella, Campylobacter, Chlamydia, Chlamydophila, Clostridium, Corynebacterium, Enterococcus, Escherichia, Francisella, Haemophilus, Helicobacter, Legionella, Leptospira, Listeria, Mycobacterium, Mycoplasma, Neisseria, Pseudomonas, Rickettsia, Salmonella, Shigella, Staphylococcus, Streptococcus, Treponema, Ureaplasma, Vibrio*, and *Yersinia*. Notable viruses include, but are not limited to: Adenoviridae, Arenaviridae, Astroviridae, Bunyaviridae, Caliciviridae, Coronaviridae, Filoviridae, Flaviviridae, Hepadnaviridae, Hepeviridae, Herpesviridae, Orthomyxoviridae, Papillomaviridae, Paramyxoviridae, Parvoviridae, Picornaviridae, Polyomaviridae, Poxviridae, Reoviridae, Retroviridae, Rhabdoviridae, and Togaviridae. Notable protozoa include, but are not limited to: *Acanthamoeba, Acrasis, Balamuthia, Besnoitia, Carpediemonas, Cryptosporidium, Endolimax, Entamoeba, Euglena, Giardia, Jakoba, Naegleria, Plasmodium, Reclinomonas, Toxoplasma, Trichomonas, Trimastix*, and *Trypanosoma*. Notable fungi include, but are not limited to: *Aspergillus, Candida, Cryptococcus, Histoplasma, Pneumocystis*, and *Stachybotrys*.

Chemical agents include G-type and V-type nerve agents, and H-class blister agents, specifically, gases such as ethyl-N,N dimethyl phosphoramino cyanidate, (common name Tabun or agent GA), isopropyl methyl phosphonofluoridate (common name Sarin or agent GB), O-ethyl-S-(2-diisopropylamino)ethyl methyl phosphonothiolate (agent VX), and vesicants including bis(2-chloroethyl) sulfide (mustard gas, agent H or agent HD), dichloro (2-chlorovinyl) arsine (Lewisite or agent L), bis(2(2-chloro ethylthio)ethyl)ester (agent T), or combinations of these or with other liquids. The G agents are phosphonofluoridate esters. The V-type chemical warfare nerve agents in addition to VX generally comprise methyl phosphonothiolates having an internal amino group. These include agents VE, VG, VM, VR, GD, GF and O-isobutyl-S-(2-diethyl) ethyl methylphosphonothiolate, and O,S-diethyl methylphosphonothiolate. The phosphonothiolates form toxic hydrolysis products comprising phosphonothioic acids. Notable agents that can be targeted include 2-chloroethyl ethyl sulfide ("2-CEES"), 2-chloroethylmethyl sulfide ("2-CEMS"), dimethyl methylphosphonate ("DMMP"), dimethyl chlorophosphate ("MCP"), diisopropyl methylphosphonate ("DIMP"), methyl dichlorophosphate ("MDCP"), diethyl methanephosphonate, diethyl ethanephosphonate, 2,4-dichlorophenol, triethyl phosphate, and diisopropyl fluorophosphonate ("DFP").

Exposure or contamination of surfaces is any process that involves deposition of toxic chemicals or biological contaminants by means of liquid, solid, aerosol, or vaporous deposition whether the toxic chemicals or biological contaminants are in a pure form or present as a component of a mixture.

Decontamination is a process comprising contacting the contaminants or contaminated surface with the reactive sorbent in order to detoxify and decontaminate the contaminated surface. Decontamination times will vary, but typically are confirmed to be on the order of one to six hours and could potentially require less time. After oxidation and detoxification of the area is complete, the sorbent (wet or dry) may be cleaned off with a water wash, or with a solution such as hydrogen peroxide solution. If the decomposition products are hazardous, the rinse water may need to be removed by vacuum. Alternatively, the wet or dry sorbent can be removed by vacuum or wiping and disposed of at an appropriate hazardous treatment facility.

Method of Production

Fumed silica with an average particle diameter of 7 nm (Product Number: 55130) and hydrogen peroxide were purchased from Millipore Sigma (formerly Sigma-Aldrich and EMD Milipore) for the synthesis of the sorbent. The hydrogen peroxide solution contained 30% w/w hydrogen peroxide in water, also included in the solution is an additional amount of stabilizer in the form of 0.5 ppm of a stannate-containing compound and 1 ppm of a phosphorus-containing compound (Product Number: 216763).

The composition was synthesized by first adding an amount of fumed silica to a glass container. Next, a starting aliquot of the undiluted hydrogen peroxide solution, at about 60-80% of the mass of fumed silica (or pure hydrogen peroxide at 18 to 24% of the mass of the fumed silica), was added to the fumed silica, and the two components were vortexed until the mixture was homogeneous. If any lumps or aggregates formed, they were scraped from the glass walls and ground up; the mixture was then vortexed again. At least two other aliquots of undiluted peroxide solution were added, at about 50 to 70 wt. % of the mass of fumed silica (or pure hydrogen peroxide at 15 to 21 wt. % of the mass of the fumed silica) each, to the mixture. The addition of aliquots was performed until a powdery mixture was formed that resembles a coarse powder that did not adhere to the walls of the container. In general, hydrogen peroxide solution was added gradually to allow the mixture to maintain a granulated powder that was still capable of absorbing liquid. Table 1 shows three samples having slight variations of silica and peroxide weight percentages that were synthesized. Lastly, the samples were placed in open, 20 mL glass vials and purged in air overnight to remove excess water from the material after synthesis. The vials were then capped and weighed, and the difference between the mass of pre-dried material and the dried material is the mass loss attributed to water. The average mass loss was between 9 to 15 w/w % of the reactive sorbent, which would be a reduction of the total mass percent of water in the material from approximately 47% w/w % to between 38 and 41 w/w %. Without wishing to be bound by theory, the vapor pressures of hydrogen peroxide and water are approximately 2 Torr and 24 Torr at 25 degrees Celsius, respectively, therefore at 25 degrees Celsius most of the mass loss is attributed to water. Further reduction of water up to 70 w/w % of the pre-dry reactive sorbent is possible, if the drying is conducted under ambient air, or facilitated by nitrogen gas.

From this production method, the peroxide was bound to the hydrophilic fumed silica particles, forming a reactive sorbent.

TABLE 1

Mass and weight percentages of peroxy-silica constituents after synthesis

| Sample | Silica Mass (g) | $H_2O$ Mass (g) | $H_2O_2$ Mass (g) | Silica w/w % | $H_2O$ w/w % | $H_2O_2$ w/w % |
|---|---|---|---|---|---|---|
| 1 | 0.5141 | 0.5323 | 0.3068 | 38.0 | 39.3 | 22.7 |
| 2 | 0.5260 | 0.5359 | 0.3138 | 38.2 | 39.0 | 22.8 |
| 3 | 0.5681 | 0.6316 | 0.3387 | 36.9 | 41.1 | 22.0 |

EXPERIMENTS

The experiments involving reaction of Sample 1 from the method of production with either diethyl sulfide ("DES"), 2-chloroethyl ethyl sulfide ("2-CEES"), mustard gas ("HD"), or N,N-dimethylphenethylamine ("DMPEA"), were all performed in the same manner. Approximately 20 mg of reactive sorbent from Sample 1 was added to a vial and then an amount of the pure toxic chemical was added to the vial at a ratio of 1 µL of chemical to 10 mg of the reactive sorbent; to yield a mixture of approximately 2 µL of the chemical and 20 mg of reactive sorbent. The reactive sorbent and the chemical were then thoroughly mixed using a vortexer for 1 minute and then allowed to react for one hour. Afterwards, 1.5 mL of acetonitrile was then added to the reaction mixture, and the vial was then mixed for 1 minute using a vortexer for extracting products and reactants. After vortexing, the mixture was centrifuged at 7 k rpm for 3 minutes to clarify the solution. The sorbent-free solution was then removed using a glass pipet and analyzed using GC-MS.

For fentanyl-citrate ("F-C"), the experiments were instead conducted by first adding approximately 75 mg of the reactive sorbent to a vial followed by an addition of 1292 µL of deionized water and 100 µL of 0.0001769 M F-C in water. The mixture was then stirred continuously for 24 hours. After 24 hours has elapsed, an amount of 1200 µL of 1.6 M sodium sulfite was added to the vial to quench the reaction, the solution was then vortexed for 1 minute and its aliquot was placed in a secondary vial that was then centrifuged at 7 k rpm for 3 minutes to clarify the solution. Once clarified, an amount of liquid is removed from the secondary vial and analyzed using LC-MS.

The percent removal of a given compound is defined as the percent of compound removed through either adsorption or reaction. During a surface reaction, products and reactants could be either bound to the surface or unbound. For the analysis of the reactions using GC-MS or LC-MS techniques, solvent, either water for F-C experiments or acetonitrile for the other aforementioned compounds, is first added to remove and to dissolve the products and reactants. After the solvent extraction, some products/reactants may remain bound to the surface. The resulting extraction mixture was analyzed, and the integrated signal area of the reactant species was compared to the integrated signal area of a reactant standard or a series of reactant standards of known concentration. The percent removal of the reactant was then calculated as the difference between the standard concentration and that which was observed. However, only solvated molecules will be detected in this manner, and molecules still strongly bound to the surface will not be detected. The percent composition of the final reaction mixture is determined by comparing the integrated signal area of an individual species to the summation of all species' integrated areas in the spectrum as it is not feasible to prepare standards for the multitude of products that form. The percent removal for each compound reacted with the reactive sorbent is shown in Table 2. The final reaction mixture compositions of products and reactants for each chemical of interest are shown respectively in tables 3, 4, 5, 6, and 7.

TABLE 2

Results of decontamination studies of HD, F-C, and respective simulant analogs.

| Reactive Sorbent | Chemical of Interest | Structure | Ratio Chemical/Sorbent | Reaction Time | Percent Removal |
|---|---|---|---|---|---|
| Peroxy-Silica | 2-Chloroethyl ethyl sulfide (2-CEES) | (structure) | 1 µL (2-CEES)/10 mg | 1 hour | ~100% |
| Peroxy-Silica | Diethyl sulfide (DES) | (structure) | 1 µL (DES)/10 mg | 1 hour | ~100% |
| Peroxy-Silica | Mustard Gas (HD) | (structure) | 1 µL (HD)/10 mg | 1 hour | ~100% |
| Peroxy-Silica | N,N-Dimethylphenethylamine (DMPEA) | (structure) | 1 µL (DMPEA)/10 mg | 1 hour | ~30% |
| Peroxy-Silica | Fentanyl-Citrate (F-C) | (structure) | 1 µL (F-C)/10 mg | 24 hours | ~80% |

TABLE 3

Final reaction mixture composition of 2-CEES after treatment with the reactive peroxy-silica sorbent

| Species | Final Reaction Composition % |
|---|---|
| 2-Chloroethyl ethyl sulfide (2-CEES) | ~0% |
| 2-Chloroethyl ethyl sulfoxide (2-CEESO) | >90% |
| 2-Chloroethyl ethyl sulfone (2-CEESOO) | <5% |
| Ethyl vinyl sulfoxide (EVSO) | <5% |

TABLE 4

Final reaction mixture composition of DES after treatment with the reactive peroxy-silica sorbent

| Species | Final Reaction Composition % |
|---|---|
| Diethyl sulfide (DES) | ~0% |
| Diethyl sulfoxide (DESO) | >85% |
| Diethyl sulfone (DESOO) | <15% |

TABLE 5

Final reaction mixture composition of HD after treatment with the reactive peroxy-silica sorbent

| Species | Final Reaction Composition % |
|---|---|
| Mustard (HD) | <0.2% |
| Divinyl sulfoxide (DVSO) | ~7% |
| Divinyl sulfone (DVSOO) | ~4% |
| 2-Chloroethyl vinyl sulfoxide (2-CEVSO) | ~21% |
| 2-Chloroethyl vinyl sulfone (2-CEVSOO) | ~22% |

TABLE 5-continued

Final reaction mixture composition of HD after treatment with the reactive peroxy-silica sorbent

| Species | Final Reaction Composition % |
|---|---|
| Bis(2-chloroethyl) sulfoxide (HDO) | ~31% |
| Bis(2-chloroethyl) sulfone (HDO2) | ~11% |

TABLE 6

Final reaction mixture composition of DMPEA after treatment with the reactive peroxy-silica sorbent

| Species | Final Reaction Composition % |
|---|---|
| N,N-Dimethylphenethylamine (DMPEA) | >60% |
| Styrene | <40% |

TABLE 7

Final reaction mixture of F-C after treatment with the reactive peroxy-silica sorbent

| Species | Final Reaction Composition % |
|---|---|
| Fentanyl-Citrate | >85% |
| Oxidized Fentanyl | ~5-10% |
| Norfentanyl | ~5-10% |

For mustard gas and its simulants, approximately 100% of the analyte was removed. FIGS. 3 to 7 show the GC-MS chromatograms of the extractant mixture from the reaction of peroxy-silica sorbent with 2-CEES, DES, HD, DMPEA, and F-C respectively. Tables 3 to 7 correspond to FIGS. 3 to 7 and explain the identity and makeup of each component of the final reaction mixture. Only oxidation and elimination products were observed for HD and its analogs and no hydrolysis products were detected. In the case of F-C, the reactants and products were irreversibly bound to the surface of the reactive sorbent particulate as evidenced by the fact that the small amounts of products and the remaining F-C detected was a fraction of the total amount of F-C reacted. For the reaction of DMPEA, styrene was detected as the sole product, but the corresponding amine oxide was not, presumably lost to the column or bound to the sorbent surface. Additionally, although few products formed from the reaction of F-C with the reactive sorbent, nearly 80% of F-C was removed, indicating that either F-C, products, or both, were irreversibly bond to the sorbent surface.

Although certain preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

The invention claimed is:

1. A protective technology, comprising:
filtration media, filters, protective clothing, or fabrics, wherein said filtration media, filters, protective clothing, or fabrics include a solid particulate reactive sorbent for detoxifying toxic chemical and biological agents, said sorbent comprising a plurality of aggregates of individual hydrophilic nanoparticles and linked hydrophilic nanoparticles that are doped with or combined with at least one detoxifier, wherein said individual hydrophilic nanoparticles and linked hydrophilic nanoparticles are selected from the group consisting of: silicon oxyhydroxides, aluminum oxide, alumina, aluminum oxyhydroxides, aluminates, fumed silica, clay minerals and mixtures thereof; and wherein said hydrophilic nanoparticles have a weight ratio of 5:1 to 1:1 to said detoxifier in said reactive sorbent.

2. The protective technology of claim 1, wherein said reactive sorbent has a weight ratio of said hydrophilic nanoparticles to said detoxifier of 3:1 to 1.5:1.

3. The protective technology of claim 1, wherein said hydrophilic nanoparticles are fumed silica.

4. The protective technology of claim 3, wherein said fumed silica has an individual particle size of between 0.005 µm to 0.020 µm, and a surface area between 100 to 700 m$^2$/g.

5. The protective technology of claim 1, wherein said hydrophilic nanoparticles are present in the amount of 35 to 70 wt. % of said reactive sorbent.

6. The protective technology of claim 1, wherein said at least one detoxifier is selected from the group consisting of: perborates, persulfates, organic peroxides, hydrogen peroxide, alkali metal oxides, alkali metal peroxides and mixtures thereof.

7. The protective technology of claim 6, wherein said detoxifier is hydrogen peroxide.

8. The protective technology of claim 1, wherein said at least one detoxifier is present in an amount of 3 to 40 wt. % of said reactive sorbent.

9. The protective technology of claim 1, wherein said reactive sorbent contains less than 45 wt. % of water.

10. The protective technology of claim 1, wherein said reactive sorbent further includes a stabilizer selected from the group consisting of: lithium (I), sodium(I), potassium (I), magnesium (II), calcium (II), strontium (II), barium (II), manganese (II), manganese (IV), tin (II), tin (IV), and mixtures thereof as cations; and any oxide, hydroxide, chloride, sulfide, sulfite, fluoride, nitride, nitrate, oxynitride, oxyfluoride, stannate, phosphate, organic ligands, acetate, citrate, malonate, phytate, and mixtures thereof as anions.

11. The protective technology of claim 10, wherein said stabilizer is present in the amount of about 0.01 to 20 ppm of said reactive sorbent.

12. The protective technology of claim 1, wherein said sorbent decontaminates or absorbs chemical agents selected from the group consisting of: chemical warfare agents, toxic industrial chemicals, opioids and narcotics, and toxic chemical simulants.

13. The protective technology of claim 1, wherein said sorbent decontaminates or absorbs biological agents selected from the group consisting of: microorganisms, bacteria, viruses, microsporidians (spores), fungi, yeasts, protozoa, and phages.

14. The protective technology of claim 1, wherein said sorbent is embedded into or onto filtration media or fabrics or is sandwiched between layers of filtration media or fabrics.

* * * * *